United States Patent
Sivanandan et al.

(10) Patent No.: US 9,434,825 B2
(45) Date of Patent: *Sep. 6, 2016

(54) NUCLEOPHILIC HIGH MOLECULAR WEIGHT POLYMER FUNCTIONALIZATION THROUGH ALKYLATION

(71) Applicant: Seeo, Inc, Hayward, CA (US)

(72) Inventors: Kulandaivelu Sivanandan, Fremont, CA (US); Hany Basam Eitouni, Oakland, CA (US); Russell Clayton Pratt, Foster City, CA (US); Jonathan C. Pistorino, Oakland, CA (US)

(73) Assignee: Seeo, Inc., Hayward, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/672,163

(22) Filed: Mar. 28, 2015

(65) Prior Publication Data

US 2015/0203638 A1    Jul. 23, 2015

Related U.S. Application Data

(63) Continuation-in-part of application No. 13/946,924, filed on Jul. 19, 2013, now Pat. No. 9,012,598.

(60) Provisional application No. 61/678,486, filed on Aug. 1, 2012.

(51) Int. Cl.
| | |
|---|---|
| *C08G 65/337* | (2006.01) |
| *C08G 65/336* | (2006.01) |
| *C08J 3/21* | (2006.01) |
| *C08G 65/333* | (2006.01) |

(52) U.S. Cl.
CPC ............. *C08J 3/212* (2013.01); *C08G 65/336* (2013.01); *C08G 65/33324* (2013.01); *C08J 2363/00* (2013.01)

(58) Field of Classification Search
CPC .................................................. C08G 65/337
USPC ........ 528/405, 408, 409, 488, 495, 497, 482
See application file for complete search history.

(56) References Cited

U.S. PATENT DOCUMENTS 9,012,598 B2 *  4/2015  Sivanandan ......... C08G 65/337
                                                          528/405

OTHER PUBLICATIONS

Yokoyama M, et.al., "Synthesis of Poly(ethylene oxide) with Heterobifunctional Reactive Groups at Its Terminals by an Anionic Initiator," Bioconjugate Chemistry 1992, 3, 275-276.

Kim, et al., "Heterobifunctional poly(ethylene oxide)," Polymer Bulletin Jun. 1994, vol. 33, Issue 1, pp. 1-6.

Mahajan, S. et. al., "Synthesis and Characterization of Amphiphilic Poly(ethylene oxide)-block-poly(hexyl methacrylate) Copolymers," Macromol. Chem. Phys. 2003, 204, 1047-1055.

* cited by examiner

*Primary Examiner* — Duc Truong
(74) *Attorney, Agent, or Firm* — R'Sue Popowich Caron

(57) ABSTRACT

A new and efficient method of functionalizing high molecular weight polymers through alkylation using a metal hetero alkylbase is described. This novel procedure can also be used to synthesize polymer-based macro-initiators containing radical initiating groups at the chain-ends for synthesis of block copolymers.

11 Claims, No Drawings

NUCLEOPHILIC HIGH MOLECULAR WEIGHT POLYMER FUNCTIONALIZATION THROUGH ALKYLATION

CROSS-REFERENCE TO RELATED APPLICATIONS

This application is a Continuation-in-Part of U.S. patent application Ser. No. 13/946,924, filed Jul. 19, 2013 now U.S. Pat. No. 9,012,598 and also claims priority to U.S. Provisional Patent Application No. 61/678,486, filed Aug. 1, 2012, both of which are incorporated by reference herein.

BACKGROUND OF THE INVENTION

1. Field of the Invention

The invention is directed generally to a method of functionalizing nucleophilic high molecular weight polymers (HMP-XH) by alkylation using a substituted metal-heteroalkyl (MHTA) base. The novel scheme disclosed herein can also be used to functionalize nucleophilic high molecular weight PEO (HMPEO-XH) in order to generate PEO-based macro-initiators for controlled radical polymerizations and other functional materials.

Previous U.S. patent application Ser. No. 13/946,924, filed Jul. 19, 2013, which is the parent application to this application, was directed generally to a method of functionalizing hydroxyl-containing high molecular weight polymers (HMP-OH), a subset of nucleophilic high molecular weight polymers (HMP-XH), by alkylation using substituted metal amide (MAd) bases, a subset of substituted metal-hetero-alkyl (MHTA) bases. The novel scheme disclosed therein could also be used to synthesize PEO-based macro-initiators for controlled radical polymerizations.

Nanostructured polymer electrolytes can be used in lithium batteries to improve safety and cycle-life by restricting lithium-ion transport to ionically-conductive lamellar domains. Such a structure can be made through the self-assembly of di-or tri-block copolymers containing at least two distinct phases a hard, structural phase and a soft, ionically-conductive phase. The soft phase, which can be PEO or PEO-based, provides a nano-domain for lithium ion transport; the hard phase, usually a high $T_g$ polymer (a high $T_g$ being one that is above the cell operating temperature), provides a nano-domain for mechanical stability in the polyelectrolyte thin film and prevents formation of lithium dendrites that can otherwise grow from anode to cathode, shorting the battery. An example of such a PEO-based polymer electrolyte is PS-b-PEO-b-PS tri-block copolymer, where polystyrene (PS), the hard component, phase separates from PEO, the ionically conductive component, to form a nanostructured block copolymer electrolyte for a lithium battery.

It has been difficult to establish a synthetic route to produce such block copolymers on an industrial scale, especially a route that is reproducible, safe, and economical. Generally, block copolymers based on PEO are grown from PEO-based macro-initiators, which in turn are obtained from telechelic PEO with reactive end groups such as α,ω-dihydroxy PEO, α,ω-di(aminoethyl) PEO, or α,ω-di(mercaptoethyl) PEO. A common approach to generate PEO-based macro-initiators for atom transfer radical polymerization (ATRP) is by a simple esterification of the terminal hydroxyl or nucleophilic groups (OH, SH or $NH_2$) with an acid halide in the presence of a mild base such as triethylamine ($Et_3N$). For example, as shown in (1) below, reaction of α-bromoisobutyryl bromide with HX-PEO-XH in the presence of $Et_3N$ results in a macro-initiator with α-bromoisobutyryl groups at the chain-ends. The reaction is highly exothermic, so it can be performed using relatively low temperatures and short times and still produce substantial yields. Once the macro-initiator is in place, a variety of vinyl monomers can be polymerized through atom transfer radical polymerization (ATRP) to generate various triblock copolymers. Unfortunately, some of the newly formed —X—C(=O)— linkers through this method are susceptible to hydrolysis even under mild acid or basic conditions. In addition, a block copolymer electrolyte containing an —X—C(=O)— will readily degrade when in contact with lithium metal, which is a strong reducing agent, making electrolytes produced in this way unsuitable for lithium batteries.

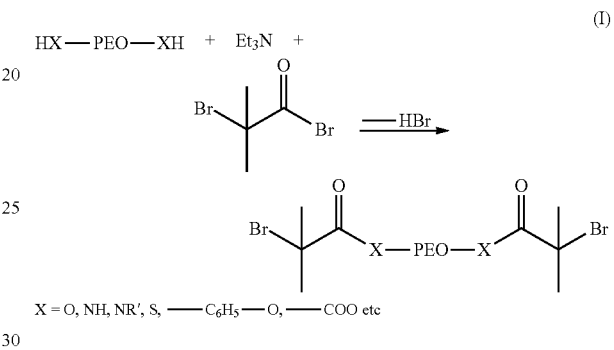

Another method for synthesizing PEO-based macro-initiators is to terminate a living chain PEO using an electrophilic initiator such as α-bromoisobutyryl bromide. This also produces an —X—C(=O)— (X is O in this case) between the polymer components, making it unsuitable for synthesis of electrolytes for lithium batteries.

Linkers based on —X—$CH_2$— (ether, thioether, or amine), as shown with PEO in (2) below, are chemically more robust when compared to an —X—C(=O)— groups, but they are not as easy to synthesize because formation of these robust bonds require a stronger base and more stringent conditions (e.g., longer reaction times, elevated temperatures) than for an —X—C(=O)— bond. In addition, high molecular weight polymers may degrade during such high temperature processing conditions.

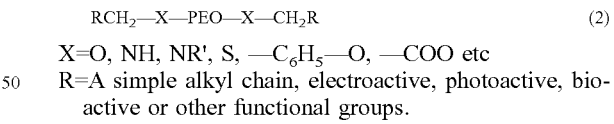

X=O, NH, NR', S, —$C_6H_5$—O, —COO etc
R=A simple alkyl chain, electroactive, photoactive, bioactive or other functional groups.

There are several reactions that are known to produce PEO-based macro-initiators and other functional polymers using X—$CH_2$-linkers, but there are drawbacks to most of these. For example, commonly used hydroxides for alkylation of PEO, potassium hydroxide (KOH) and sodium hydroxide (NaOH), are soluble only in polar solvents such as DMF, DMSO, water, and methanol. After alkylation, removal of such polar solvents and excess hydroxides from functionalized PEO is very difficult even after several stages of purifications.

PEO can also be functionalized using hydrides such as sodium hydride (NaH) and potassium hydride (KH); however, these reagents are pyrophoric and are unsafe for use in large-scale manufacturing. Also, removal of hydroxides, a byproduct of alkylation using hydrides, from PEO is extremely difficult.

Similarly, organo-metallic bases such potassium naphthalenide and diphenylmethyl potassium that are synthesized in-situ from the highly pyrophoric potassium metal can be used for PEO functionalization. These bases are highly reactive and flammable when exposed to air and are not commercially available, making them extremely poor candidates for alkylation on a large scale.

What is needed are methods for functionalizing and isolating nucleophilic high molecular weight polymers (HMP-XH). It would be especially useful if such methods used materials that are effective, safe, inexpensive, readily available, and appropriate for functionalization of HMP-XH on a commercial scale. It would also be useful if such methods resulted in functionalized and isolated nucleophilic high molecular weight polymers (HMP-XH) did not adversely affect the stability of such polymers.

SUMMARY

In one embodiment of the invention, a method of functionalizing a nucleophilic high molecular weight polymer is disclosed. The method involves dissolving the nucleophilic high molecular weight polymer in a first solvent and reacting with a metal hetero alkyl (MHTA) base, to form a first solution; mixing RZ with the first solution to form a second solution, wherein R is an alkyl group and Z is a leaving group; mixing the second solution with a second solvent to form a third solution, wherein the second solvent is capable of dissolving the MHTA, the RZ, and any reaction byproducts in the first solution and the second solution; and precipitating a functionalized high molecular weight polymer from the third solution.

In one arrangement, the nucleophilic high molecular weight polymer has a molecular weight between about 1 and 500 Kg mol$^{-1}$, as determined by viscosity. In one arrangement, the nucleophilic high molecular weight polymer is a high molecular weight polymer with one or more XH groups. Each XH group is selected independently from hydroxyl, thiol, primary amine, secondary amine, phenolic groups, and combinations thereof.

In various embodiments, the nucleophilic high molecular weight polymer is selected from the group consisting of poly(ethyleneoxide), poly(propyleneoxide), poly(tetrahydrofuran), α,ω-dihydroxypoly(styrene), α,ω-dihydroxy polybutylene, α,ω-dihydroxy polyisoprene, poly(hydroxyethylacrylate), poly(hydroxymethylstyrene), poly(vinylalcohol), α,ω-di(aminoethyl)polyethyleneoxide, α,ω-di(mercaptoethyl) polyethyleneoxide, poly(allylamine), poly(vinylthiol), poly(4-hydroxystyrene), polyglycidyl amine, poly(4-(mercaptomethyl)styrene), and combinations thereof.

In various embodiments, the MHTA is selected from the group consisting of lithium bis(trimethylsilylamides), sodium bis(trimethylsilylamides), potassium bis(trimethylsilylamides), potassium tert-butoxide, sodium tert-butoxide, potassium sec-butoxides, potassium tert-pentaoxides, and combinations thereof.

The first solvent may be any of THF, DMF, toluene, DMSO, cyclohexanone, xylene, benzene, and combinations thereof.

The RZ may be an alkyl halide. The alkyl halide may include a functional group selected from the group consisting of photoactive groups, electroactive groups, controlled radical polymerization initiators, monomers, reactive alkenes/olefins, click functionalities, and biochemical groups for conjugation to biological molecules.

The leaving group Z may be any of fluorides, chlorides, bromides, iodides, triflates, mesylates, tosylates, N-oxysuccinimides, and combinations thereof.

The second solvent may be any of ethanol, 2-propanol, 1-propanol, 1-butanol, 22-butanol, tert-butanol, and combinations thereof.

In another embodiment of the invention, a method of functionalizing a nucleophilic high molecular weight polymer involves dissolving the nucleophilic high molecular weight polymer in a first solvent and reacting with metal hetero alkyl (MHTA) base, to form a first solution; mixing RZ with the first solution to form a second solution; mixing the second solution with a second solvent to form a third solution, wherein the second solvent dissolves the MHTA, the RZ, and any reaction byproducts from the first solution and the second solution; and precipitating a functionalized high molecular weight polymer from the third solution. The RZ is an alkyl halide and the alkyl halide includes a functional group selected from the group consisting of photoactive groups, electroactive groups, controlled radical polymerization initiators, monomers, reactive alkenes/olefins, click functionalities, and biochemical groups for conjugation to biological molecules.

DETAILED DESCRIPTION

The preferred embodiments are illustrated in the context of functionalization of high molecular weight PEO (HMPEO). The skilled artisan will readily appreciate, however, that the materials and methods disclosed herein will have application in a number of other contexts where functionalization of high molecular weight polymers is desired, particularly where safety and cost are important.

All publications referred to herein are incorporated by reference in their entirety for all purposes as if fully set forth herein.

In the embodiments described herein, the term "high molecular weight" is used to mean molecular weights between about 1 and 500 Kg mol$^{-1}$.

Abbreviations

The following chemical abbreviations are used throughout this disclosure:

| Abbreviation | Chemical Name |
|---|---|
| HMP-XH | Nucleophilic high molecular weight polymer |
| XH | Nucleophile |
| HMP | High molecular weight polymer |
| HMP-f | Functional high molecular weight polymer |
| MHTA | Metal hetero alkyl |
| PEO | Polyethyleneoxide |
| HMPEO | High molecular weight PEO |
| HMPEO-XH | Nucleophilic high molecular weight PEO |
| HMPEO-f | functional high molecular weight PEO |
| RZ | Electrophile or alkyl halide |
| THF | tetrahydrofuran |
| DMF | dimethylformamide |
| DMSO | dimethyl sulfoxide |
| EO | ethylene oxide |
| t-BuOLi | Lithium tert-butoxide |
| t-BuONa | Sodium tert-butoxide |
| t-BuOK | Potassium tert-butoxide |
| sec-BuOK | Potassium sec-butoxide |
| t-PentOK | Potassium tert-pentoxide |
| KHMDS | potassium bis (trimethylsilyl) amide or potassium hexamethyldisilyl amide |
| NaHMDS | Sodium bis (trimethylsilyl) amide |
| LiHMDS | Lithium bis (trimethylsilyl) amide |
| KOH | potassium hydroxide |

| Abbreviation | Chemical Name |
|---|---|
| NaOH | sodium hydroxide |
| PS | polystyrene |

In one embodiment of the invention, a method of functionalizing a nucleophilic high molecular weight polymer (HMP-XH) comprises the steps of: a) dissolving the HMP-XH in a first solvent and reacting with a metal hetero alkyl (MHTA) base; b) adding RZ; c) adding the mixture to a second solvent (the second solvent is capable of dissolving the MHTA, the RZ, and any reaction byproducts from steps a and b); and d) precipitating functional high molecular weight polymer (HMP-f) from the solution formed in step c). In one arrangement, the HMP-XH has a molecular weight between about 1 and 500 Kg mol$^{-1}$.

In one embodiment of the invention, HMP-XH comprises one or more nucleophilic groups, as shown in (3) below. In one arrangement, XH of the nucleophilic high molecular weight polymer, HMP-XH, includes one or more of hydroxyl (—OH), primary amine (—NH$_2$), secondary amine (—NRH), thiol (—SH), phenolic group (—C$_6$H$_5$—OH), and carboxylic acid (—COOH), as shown in (3) below.

$$HMP—(XH)_n \quad (3)$$

XH=—OH, —NH$_2$, —NHR', SH, —C$_6$H$_5$—OH, COOH or combination within n=1 or more In another embodiment of the invention, the HMP-XH is selected from the group consisting of polymers such as poly(ethyleneoxide), poly(propyleneoxide), poly(tetrahydrofuran), α,ω-dihydroxy poly(styrene), α,ω-dihydroxy polybutylene, α,ω-dihydroxy polyisoprene, poly(hydroxyethylacrylate), poly(hydroxymethylstyrene), poly(vinylalcohol), α,ω-di(aminoethyl) polyethyleneoxide, α,ω-di(mercaptoethyl) polyethyleneoxide, poly(allylamine), poly(vinylthiol), poly(4-hydroxystyrene), polyglycidyl amine, and poly(4-(mercaptomethyl)styrene).

In another embodiment of this invention, HMP-XH can have a variety of architectures such as brush, graft, star, hyperbranched and H-shaped as shown in (4) below.

(4)

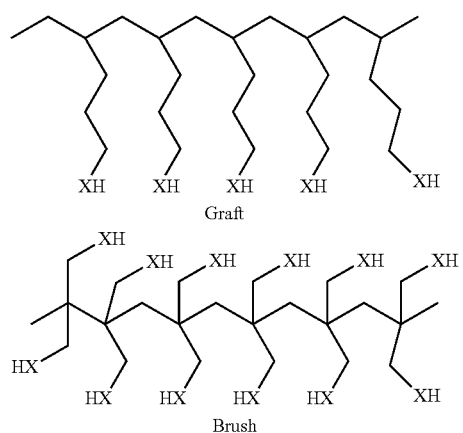
Graft

Brush

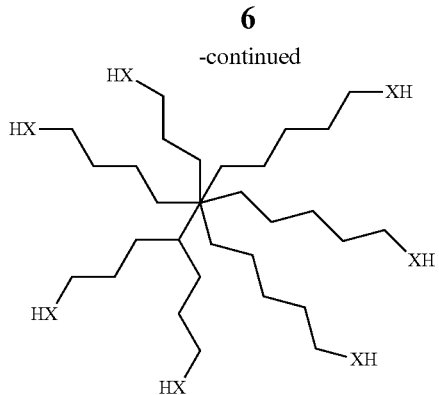
Star

Hyper branched

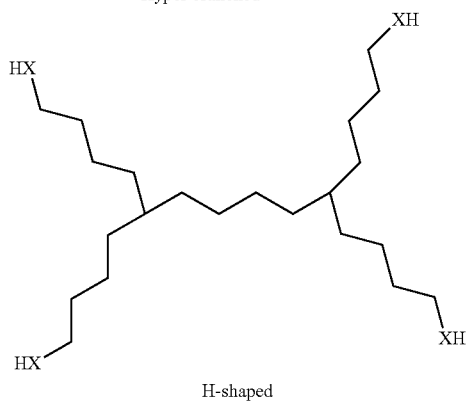
H-shaped

XH = —OH, —NH$_2$, —NHR', SH, —C$_6$H$_5$—OH, COOH
or combination within

In various embodiments of the invention, M of MHTA can be lithium, sodium, potassium, or cesium.

In various embodiments of the invention, HTA of MHTA is a methoxide, ethoxide, tert-butoxide, sec-butoxide, tent-pentoxide, bis(trimethylsilyl)amide, or di-isopropylamide, as shown in (5) below.

$$M-HT-A \quad (5)$$

M=Li, Na, K, Cs, Zn etc

If Ht=O, A=—CH$_3$, —C$_2$H$_5$, —CH(CH$_3$)$_2$, —C(CH$_3$), —C(CH$_3$)$_2$CH$_2$CH$_3$ and —OC$_8$H5 etc.

If HT=N; A=—(CH(CH$_3$)$_2$)$_2$, —(Si(CH$_3$)$_3$)$_2$ etc

In one embodiment of the invention, the first solvent is any one or more of THF, DMF, toluene, DMSO, cyclohexanone, xylene, and benzene; and the second solvent is any of ethanol, 2-propanol, 1-propanol, 1-butanol, 2-butanol, and tert-butanol.

In one embodiment of the invention the RZ is an alkyl halide that comprises a functional group such as a photoactive group, an electroactive group, a controlled radical polymerization initiator, a monomer, a reactive alkene/olefin, a click functionality, or a biochemical group for conjugation to biological molecules.

In one embodiment of the invention, the Z in RZ can be one or more of fluorides, chlorides, bromides, iodides, triflates, mesylates, tosylates, and N-oxysuccinimides.

In one embodiment of the invention the second solvent can be one or more of ethanol, 2-propanol, 1-propanol, 1-butanol, 2-butanol, and tert-butanol.

In one embodiment of the invention, MHTA is a metal alkoxide and is used as the base in a reaction to functionalize HMPEO-XH with hydroxyl nucleophilic groups. This novel scheme can be used to synthesize PEO-based macro-initiators containing radical initiating groups at the chain-ends. MHTAs are highly soluble, commercially available bases that are less reactive and less dangerous when compared to the metal hydrides and organometallic bases. In addition, due to their high solubility, MHTA bases enable efficient functionalization of PEO even in non-polar solvents.

MHTA bases have not previously been used to functionalize HMPEO-XH or other HMPs. MHTA base such as KHMDS and t-BuOK are highly basic, sterically-protected bulky bases. They are poor nucleophiles due to the presence of bulky solubilizing groups. It is their basicity that is used to deprotonate and favor alkylation in the methods described herein.

In one embodiment of the invention, a solution of HMPEO-XH in an anhydrous solvent is treated with an excess amount of MHTA (solution in anhydrous solvent) and allowed to react for about 30 minutes to 48 hours at a temperature between about 20° C. and 65° C. The term "excess amount" refers to more than the stoichiometric amount that would be required for the reaction. In this case, this could anything more than 2 molar equivalents per chain of PEO. In one arrangement, the reaction time is between about 0.5 and 24 hours, and the temperature is between about 25° C. and 60° C. In yet another arrangement, the reaction time is between about 3 hours and 10 hours and the reaction temperature is about 55° C. In one arrangement there are between about one and 20 equivalents of MHTA per PEO chain. In another arrangement, there are between about four and 10 equivalents of MHTA per PEO chain. In yet another arrangement there are about 3 equivalents of MHTA per PEO chain. Then a solution of RZ (where R is an alkyl group and Z can be a halide or other leaving group) in an anhydrous solvent is added to the MHTA-PEO solution and the reaction proceeds for about 1 to 48 hours.

Reaction of HMPEO-XH with RZ in the presence of MHTA results in the alkylation of HMPEO-XH to form HMPEO-f, as shown in (6) below. The functionalized polymer is then isolated by precipitation. This is accomplished by adding the polymer solution to a solvent which dissolves the MHTA, the RZ, and any reaction byproducts but which does not dissolve the HMPEO-f. The solid HMPEO-f is then collected and dried. As described above and in the reaction below (6), the HMPEO-XH can be either mono or difunctional, in the case of telechelic PEO. However, in case of other HMP-XH, there can be more than two occurrences of XH depending on the polymer architecture, for example graft, star, or hyperbranched. Also note that XH in case of pristine PEO is OH. In case of modified HMPEO and other HMPs, XH can be a $NH_2$, SH, or COOH.

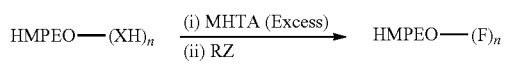

(6)

XH = OH for pristine PEO
F = functional group after alkylation
n = 1 or 2 in case of pristine telechelic HMPEO In one embodiment of the invention, the anhydrous solvent is chosen based on its ability to solublize the HMP and MHTA. Examples include, but are not limited to one or a mixture of THF, DMF, toluene, DMSO, cyclohexanone, xylene, and benzene.

In one embodiment of the invention, the precipitation is performed in a solvent which dissolves the MHTA, the RZ, any reaction byproducts, but not the HMP-f. Examples include, but are not limited to ethanol, 2-propanol, 1-propanol, 1-butanol, 2-butanol, and tert-butanol.

In another embodiment of this invention, XH of HMPEO-XH comprises hydroxyl (OH), primary amine ($—NH_2$), secondary amine (—NRH), thiol (—SH), phenolic group ($—C_6H_5—OH$), and carboxylic acid (—COOH).

In another embodiment of the invention, this reaction described above can also be used for the functionalization of other telechelic polyethers such as poly(propyleneoxide) (PPO), poly(allylglycidylether) (PAGE), poly(t-butylglycidylether) (PtBuGE).

In another embodiment, this method can be used to functionalize telechelice HMPs that are not polyether-based, such as as α,ω-dihydroxy poly(styrene), α,ω-dihydroxy polybutylene, α, and ω-dihydroxy polyisoprene.

In another embodiment, the method disclosed herein can be used to functionalize HMPs with more than one XH group. Examples include, but are not limited to poly(vinyl alcohol) (PVA), poly(4-hydroxystyrene) (PHS), poly(hydroxymethylstyrene) (PHMS), poly(allylamine) (PAAm), poly(vinylthiol) (PVT), and polyglycidyl amine (PGyAm) and poly(4mercaptomethyl)styrene) (PMMS), poly(hydroxyethylacrylate) (PHEA). Polymers with low molecular weights, oligomers, and small molecules can also be functionalized using the MHTA base.

The basicity of MHTA can be varied by changing the metal cation (i.e., M of MHTA). Possible metal cations include, but are not limited to lithium (Li), sodium (Na), potassium (K), cesium (Cs), and zinc (Zn). Examples of MHTA include but not restricted to LiHMDS, KHMDS, NaHMDS, t-BuOLi, t-BuONa, and t-BuOK. For deprotonating polymers with high acidic protons (such as phenols), a weaker base can be used. Using a weaker base is less likely to result in unwanted side reactions.

In another embodiment of the invention, amide-based MHTA with different substituents on nitrogen can be utilized to tune the basicity and solubility. In one arrangement, silyl groups with different aliphatic substituents such as bis (trimethylsilyl), bis(triethylsilyl) or their combination can impart different properties to MHTA. Similarly, different alkyl substituents on nitrogen such as dimethyl, diethyl di-isopropyl are other possibilities. A combination of alkyl and silyl substituted amides such as N-2-(2,2,5,5-tetramethyl-1-aza-2,5-disilacyclopentyl)-ethylmethylamine is yet another possibility. Unsubstituted amides such as sodium amide, lithium amide can also be used instead of MTHA base; however, their solubility is very poor in non-polar solvents.

In another embodiment, the basicity of alkoxide based MHTA can be tuned by choosing the appropriate alkoxide. For example, tert-butoxide is sterically hindered and bulky which makes it more basic and less nucleophilic; however, methoxide, a smaller base, is more nucleophilic and less basic. Some of the examples of different alkoxide-based MHTAs include but are not restricted to t-BuOK, t-PentOK, and sec-BuOK.

A variety of R groups such as aliphatic, aromatic, cyclic, acyclic, branched hydrocarbons, monomers, or reactive alkenes/olefins can be introduced in HMP using this procedure.

Other possibilities include substituted aromatic or heterocyclic functional groups such as pyridine, thiophene, furan, and indole; photoactive units such as pyrene, anthracene, and dansyl; electroactive units such as ferrocene and viologen; bioactive molecules such as biotin and avidin for bio-conjugation.

Introduction of controlled radical initiating groups such α-bromoisobutryl, 4-(2-bromoethyl)phenyl (ATRP initiators), dithiocarbonates (RAFT initiator), N-tert-Butyl-O-[1-[4-(chloromethyl)phenyl]ethyl]-N-(2-methyl-1-phenylpropyl)hydroxylamine (TIPNO) (NMP initiators) are also possible. Such HMP-f can be used as a precursor to synthesize block copolymers, dendronized block copolymers, and other polymeric architectures.

HMP-based macromonomers can be synthesized by incorporating vinyl monomers such as styrene, acrylate, and methacrylate; cyclic monomers such as lactone and oxazoline.

Click functionalities such as acetylene, ethylene, cyclic acetylene, azides, thiols, cyclopentadiene, anthracene, meliemide, and furan can also be incorporated in to polymers using this method.

In another embodiment of this invention, the reactivity of RZ can be altered by changing the leaving group (Z) such as fluoride, chloride, bromide, iodide, tosylate, mesylate, triflate, esters, N-oxysuccinimide, and other commonly used leaving group.

EXAMPLE

The following example provides details relating to composition and fabrication of functionalized nucleophilic high molecular weight polymers in accordance with the present invention. It should be understood the following is representative only, and that the invention is not limited by the detail set forth in this example.

Functionalization of HMPEO: A solution of potassium tert-butoxide (4.5 mL, 1M, 15 equiv./PEO chain) was added slowly to a solution of HMPEO (75 g, 0.3 mmol) in 600 mL of THF at 60° C. and then stirred for 1 hour. A solution of benzyl bromide (0.872 g, 5.1 mmol) in THF (10.0 mL) was added to the solution drop-wise. The new mixture was stirred for about another 12 hours to ensure the PEO functionalization reaction was complete. The functionalized PEO was isolated by precipitation in 2-propanol (5 L) to ensure complete removal of the excess reagents. Finally, the product was filtered and dried under high vacuum to obtain 75.0 g of functionalized material. The molecular weight determined by end group analysis was 191 Kg mol$^{-1}$ as determined from 500 MHz $^1$H NMR, confirming complete functionalization.

This invention has been described herein in considerable detail to provide those skilled in the art with information relevant to apply the novel principles and to construct and use such specialized components as are required. However, it is to be understood that the invention can be carried out by different equipment, materials and devices, and that various modifications, both as to the equipment and operating procedures, can be accomplished without departing from the scope of the invention itself.

We claim:

1. A method of functionalizing a nucleophilic high molecular weight polymer comprising the steps of:
   a. dissolving the nucleophilic high molecular weight polymer in a first solvent and reacting with a metal hetero alkyl (MHTA) base, to form a first solution;
   b. mixing RZ with the first solution to form a second solution, wherein R is an alkyl group and Z is a leaving group;
   c. mixing the second solution with a second solvent to form a third solution, wherein the second solvent dissolves the MHTA, the RZ, and any reaction byproducts from steps a and b; and
   d. precipitating a functionalized high molecular weight polymer from the third solution.

2. The method of claim 1 wherein the nucleophilic high molecular weight polymer has a molecular weight between 1 and 500 Kg mol$^{-1}$.

3. The method of claim 1 wherein the nucleophilic high molecular weight polymer comprises a high molecular weight polymer with one or more XH groups, wherein each XH group is selected independently from the group consisting of hydroxyl, thiol, primary amine, secondary amine, phenolic groups and combinations thereof.

4. The method of claim 1 wherein the nucleophilic high molecular weight polymer is selected from the group consisting of poly(ethyleneoxide), poly(propyleneoxide), poly(tetrahydrofuran), α, ω-dihydroxy poly(styrene), α, ω-dihydroxy polybutylene, α, ω-dihydroxy polyisoprene, poly(hydroxyethylacrylate), poly(hydroxymethylstyrene), poly(vinylalcohol), α, ω-di(aminoethyl) polyethyleneoxide, α, ω-di(mercaptoethyl) polyethyleneoxide, poly(allylamine), poly(vinylthiol), poly(4-hydroxystyrene), polyglycidyl amine, poly(4-(mercaptomethyl)styrene), and combinations thereof.

5. The method of claim 1 wherein the MHTA is selected from the group consisting of lithium bis(trimethylsilylamides), sodium bis(trimethylsilylamides), potassium bis(trimethylsilylamides), potassium tert-butoxide, sodium tert-butoxide, potassium sec-butoxides, potassium tert-pentaoxides, and combinations thereof.

6. The method of claim 1 wherein the first solvent is selected from the group consisting of THF, DMF, toluene, DMSO, cyclohexanone, xylene, benzene, and combinations thereof.

7. The method of claim 1 wherein the RZ is an alkyl halide.

8. The method of claim 7 wherein the alkyl halide comprises a functional group selected from the group consisting of photoactive groups, electroactive groups, controlled radical polymerization initiators, monomers, reactive alkenes/olefins, click functionalities, and biochemical groups for conjugation to biological molecules.

9. The method of claim 1 wherein the leaving group Z is selected from the group consisting of fluorides, chlorides, bromides, iodides, triflates, mesylates, tosylates, N-oxysuccinimides, and combinations thereof.

10. The method of claim 1 wherein the second solvent is selected from the group consisting of ethanol, 2-propanol, 1-propanol, 1-butanol, 2-butanol, tert-butanol, and combinations thereof.

11. A method of functionalizing a nucleophilic high molecular weight polymer comprising the steps of:
   a. dissolving the nucleophilic high molecular weight polymer in a first solvent and reacting with metal hetero alkyl (MHTA) base, to form a first solution;
   b. mixing RZ with the first solution to form a second solution;
   c. mixing the second solution with a second solvent to form a third solution, wherein the second solvent dissolves the MHTA, the RZ, and any reaction byproducts from steps a and b; and d. precipitating a functionalized high molecular weight polymer from the third solution;
wherein the RZ is an alkyl halide comprising a functional group selected from the group consisting of photoactive groups, electroactive groups, controlled radical polymerization initiators, monomers, reactive alkenes/olefins, click functionalities, and biochemical groups for conjugation to biological molecules.

* * * * *